A. ST. JAMES.
SIMPLEX JOINT.
APPLICATION FILED JAN. 18, 1916.
1,219,183. Patented Mar. 13, 1917.
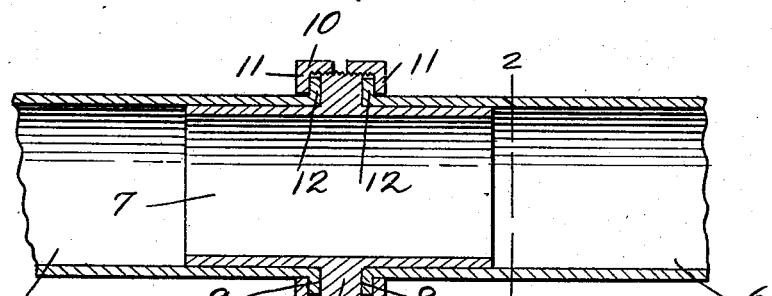
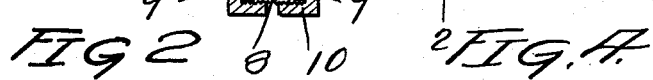
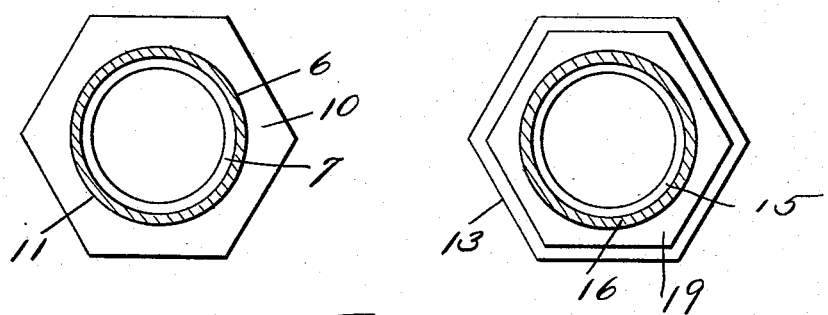
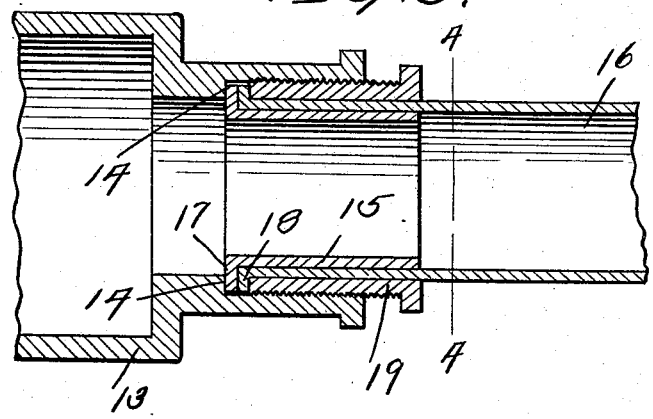
Witnesses
Inventor
A. St James
By Chandler & Chandler
Attorneys

UNITED STATES PATENT OFFICE.

ALFRED ST. JAMES, OF BROOKLYN, NEW YORK.

SIMPLEX JOINT.

1,219,183.   Specification of Letters Patent.   Patented Mar. 13, 1917.

Application filed January 18, 1916. Serial No. 72,775.

*To all whom it may concern:*

Be it known that I, ALFRED ST. JAMES, a citizen of the United States, residing at Brooklyn, in the county of Kings, State of New York, have invented certain new and useful Improvements in Simplex Joints; and I do hereby declare the following to be a full, clear, and exact description of the invention, such as will enable others skilled in the art to which it appertains to make and use the same.

This invention relates to pipe joints, and aims primarily to provide means whereby the well known wipe joint now employed in connecting pipe ends may be obviated.

A further object of the invention is to provide a simple means whereby pipe ends may be quickly and easily connected, and which provides a joint of such character that the danger of leakage of fluid through the joint will be reduced to a minimum.

A further object of the invention is to provide means for connecting pipe ends, which is of simple and inexpensive construction, which is capable of being applied to the ends to be connected without special tools or knowledge, which may be quickly and easily removed, and which will prove thoroughly efficient in practice.

A still further object of the invention is to provide means whereby the ends of pliable pipes, such as those made of lead, may be quickly and conveniently joined without danger of the pipe ends being so flexed or crimped as to restrict their diameters.

With these objects in view, together with others which will appear as the description proceeds, the invention resides in the novel combination of parts, all as will be described more fully hereinafter, illustrated in the accompanying drawings and particularly pointed out in the appended claim.

The invention will be best understood by reference to the accompanying drawings, wherein:

Figure 1, is a longitudinal section through the ends of pipes of conventional form and illustrating the application of a joint embodying my invention, Fig. 2, is a sectional view taken substantially upon the line 2—2 of Fig. 1, Fig. 3, is a longitudinal sectional view through a conventional form of reducing connection and illustrating a slightly modified form of means constructed in accordance with my invention for securing a pipe thereto, and Fig. 4, is a sectional view taken substantially on line 4—4 of Fig. 3.

Referring more particularly to the drawings, 5 and 6 indicate respectively the ends of conventional water pipes, which may be service pipes, or which may be drain or outlet pipes, and as the invention aims primarily to provide a pipe joint, such as is used in trap or drain pipes to sinks and washstands, the preferred embodiment of the invention will be described as used in connection with such pipes. For connecting efficiently the said pipe ends, a connector, in the form of a substantially short tubular section 7, is employed. This section may be made of thin rigid metal, and is of a diameter to be inserted at its ends within the ends of the pipe sections 5 and 6 respectively. Intermediate the ends of the connector 7, an annular flange 8 is arranged, the said flange extending outwardly from the body portion of the connector and providing oppositely disposed shoulders 9 adapted to be engaged by the ends of the opposite pipe members. The periphery of the flange 8 is threaded as shown, and nut sections 10 are arranged for engagement on the threaded portion. Each of the nut sections is provided with an annular inwardly extending flange 11, which projects inwardly from one end thereof a distance sufficient to engage upon the surface of the pipes 5 and 6. In practice, the nut sections 10 are slipped upon the ends 5 and 6 of the pipe. The extreme ends of the pipes are then flared outwardly to provide the flanges 12, and the connector 7 is inserted with its opposite ends in the respective pipe ends. The nut sections are then threadedly engaged upon the flange 8 and screwed tight thereon to bind the flange 12 upon the pipe end between the shoulder 9 of the connector and the inwardly extending flange 11 upon the nut section. Owing to the pliability of the lead pipes 5 and 6, it is apparent that upon screwing up the nut sections 10 with a wrench or other suitable implement, the flared end of the said pipe will be caused to be bound securely within and to conform to the shape of the walls of the shoulder 9 and the inner face of the flange 11. By this means it will be apparent that a secure, rigid, and water tight joint is provided between the pipe ends. It is also obvious that the joint may be quickly effected and that the use of the blow torch or other heating implements now commonly used for making such pipe connections is obviated. It is also obvious that the joint may be quickly disconnected when desired, without injury or distortion of the pipe ends, and without detracting from the further effectiveness of the connector or its component parts. By having the ends of the connector extend within the open ends of the pipes 5 and 6, it is apparent that binding or clamping action of the nut sections 10, can in no way distort or press the pipe ends inwardly to such extent as to restrict the internal area of the pipe ends.

In Figs. 3 and 4 of the drawing I have disclosed a slightly modified form of the invention. This type of connector or joint is adapted to be used particularly with reducing nipples or connections, spigots or faucets, and such other ducts wherein it is desired to connect a pipe of substantially flexible nature to a fixed member of a more rigid or permanent character. In this form of invention, 13 indicates a commonly used reducer connection which is internally threaded at one end and provides a shoulder 14 at the base of the threaded portion. A thimble 15 of thin rigid material is inserted within the end of the flexible pipe 16 to project slightly beyond the end thereof. The thimble is provided at its protruding end with an annular flange 17, the said flange being adapted to engage or rest upon the shoulder 14 provided upon the interior of the member 13. The extreme end of the pipe 16 is flared to provide an outwardly extending flange 18 adapted to rest upon or engage the inner face of the flange 17 upon the thimble. The clamping nut 19 is then screwed in place within the end of the member 13 and it is apparent that the end of the said clamping nut will engage against the flange 18 binding the same securely and tightly against the flange 17, upon the thimble. The thimble is of a sufficient length to extend within the pipe 16 such distance as to prevent inward pressure being applied from the nut 19 to the surface of the pipe 16 during the adjustment of the said nut. In this manner it will be seen that the possibility of the pipe nut being clamped or restricted during the formation of the joint is entirely obviated.

I claim:

A pipe coupling, comprising in combination with alined pipe ends having opposed extremities out-turned in right-angled flanges, a tubular joint comprising a narrow flange adapted to have said right-angled flanges seated flatly thereagainst, said flange being threaded throughout its length, and a relatively long continuous pipe section extending in opposite directions from said flange and having its outer periphery equal to the normal interior dimension of the pipe ends, and collars of annular angle-metal having one side threaded on said flange, the opposite sides being adapted to clamp said right-angled flanges against said tubular joint.

In testimony whereof, I affix my signature, in the presence of two witnesses.

ALFRED ST. JAMES.

Witnesses:
PIERCE KEEFE,
EDWARD G. HUNTER.

Copies of this patent may be obtained for five cents each, by addressing the "Commissioner of Patents, Washington, D. C."